Oct. 9, 1962 R. W. SCHWARZE ET AL 3,057,648
CABLE LACER
Filed Dec. 14, 1960 2 Sheets-Sheet 1
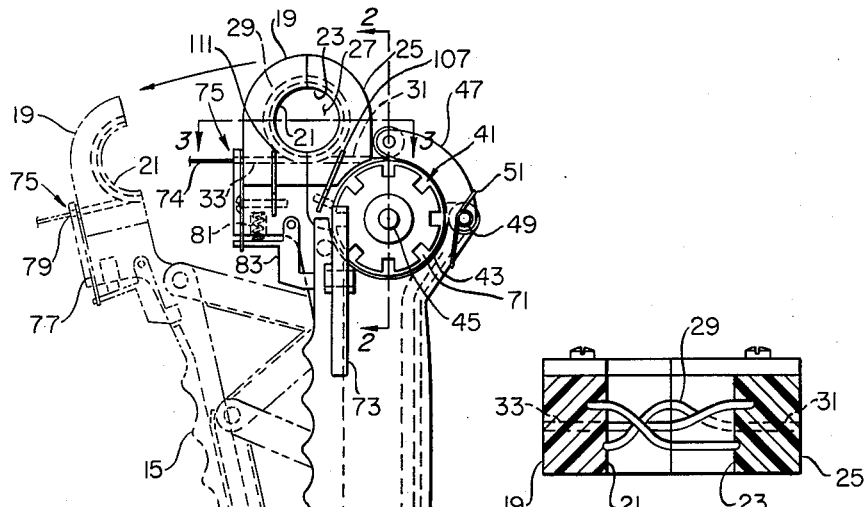
FIG. 1
FIG. 3
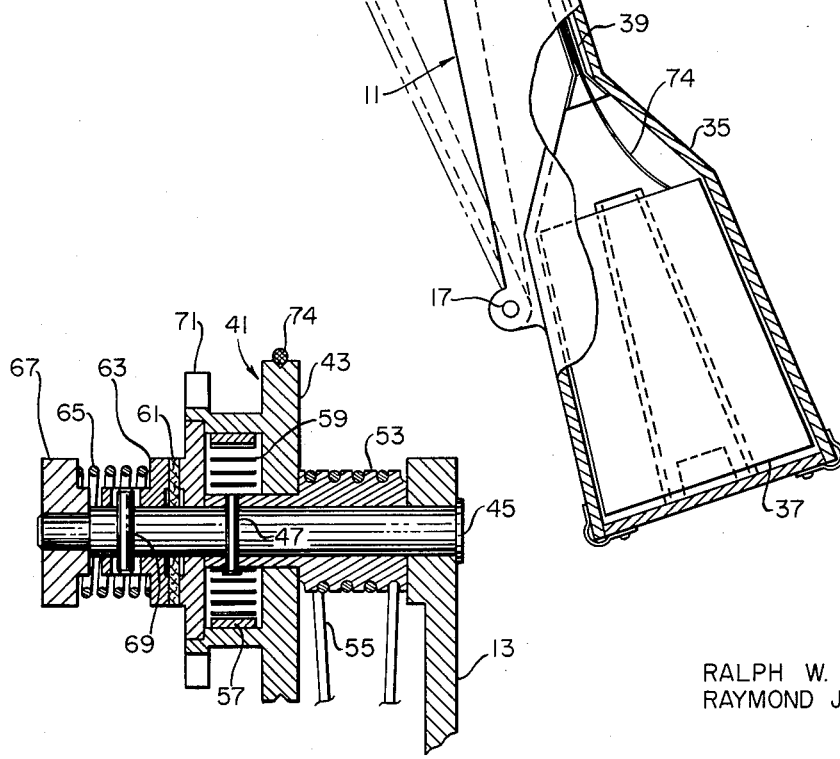
FIG. 2
RALPH W. SCHWARZE
RAYMOND J. SENGER
*INVENTORS*
BY
*Flehr and Swain*
ATTORNEYS

RALPH W. SCHWARZE
RAYMOND J. SENGER
*INVENTORS*

BY

*Behr and Swain*
ATTORNEYS

United States Patent Office 3,057,648
Patented Oct. 9, 1962

3,057,648
CABLE LACER
Ralph W. Schwarze and Raymond J. Senger, Palo Alto, Calif., assignors to Develop-Amatic Engineering, a corporation of California
Filed Dec. 14, 1960, Ser. No. 75,697
3 Claims. (Cl. 289—17)

This invention relates to cable lacers and more particularly to cable lacers which may be used automatically in a portable manner.

It is well known that in the electronic industry, there are often many cables or wires running side by side to various points in an overall assembly. It is convenient and advantageous to have these wires bound together in a single harness to provide the appearance and effect of a single larger cable. The wires then are placed in a harness type configuration before they are actually connected to the various terminals. Thus, a somewhat rigid assembly is created that is self-supporting in positions adjacent the various terminals while actual connections are being made.

To fabricate such harnesses from the various individual wires, it has long been a practice to use a twine or cable lacing material for binding. Ordinarily, a piece of the twine is wrapped about the loose bundle of wire, knotted, and then repeatedly wrapped and knotted about the cable at spaced points along the assembly. Ordinarily, this is done by hand and each loop and knot requires the attention of an individual workman. It is clearly obvious that lacing cables in accordance with the manual method just mentioned requires a considerable amount of time and labor and thereby increases the cost of cable harnesses to a considerable extent.

Moreover, similar binding is advantageous in other industries such as in plant nurseries and truck farms where flowers or produce are bound together. In short, this invention may be utilized wherever there is a need to bind several items together. Thus, the term "cable" as used throughout should be considered sufficiently broad to include other items such as flowers, vegetables, tubing, and so forth.

It is, therefore, a general object of this invention to provide an automatic cable lacer.

It is another object of this invention to provide a cable lacer for automatically knotting a piece of lacing material about a loose bundle of wire.

It is still another object of this invention to provide a machine for automatically looping cable lacing material about a cable, knotting the same thereabout, and cutting the ends to present a completely finished tied and knotted cable harness.

It is still another object of this invention to provide a cable lacer of the aforementioned characteristics which may be used by a single individual in a portable manner.

These and other objects and features of the invention will become more clearly apparent upon review of the following description in conjunction with the accompanying drawings in which:

FIGURE 1 is a front elevational view of a cable lacer in accordance with this invention showing, in solid lines, the lacer in closed condition and in dashed lines, in its opened position;

FIGURE 2 is a sectional view taken along the lines 2—2 of FIGURE 1;

FIGURE 3 is a sectional view of the head taken along the line 3—3 of FIGURE 1;

Figure 4:
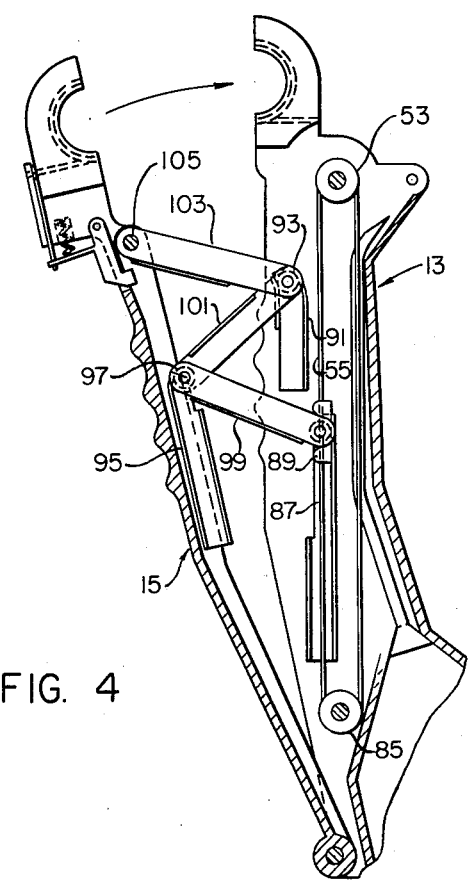
FIGURE 4 is an elevational view of the cable lacer shown in FIGURE 1 showing particularly the travelling linkage therein while the lacer is in its open position.

Referring particularly to FIGURE 1, the lacer includes a handle 11 comprising two parts 13 and 15 which are pivotally joined at 17. A spring (not shown) may be used to urge the handle in its normally open position whereby the parts 11 and 13 are separated. The portion 15 of the handle includes a head portion 19 having a semi-circular opening 21 which registers and cooperates with the opening 23 of the head portion 25 to form a central circular opening 27.

Figure 6:
FIGURE 6 is a top view of a knot made with the cable lacer in accordance with this invention.
Figure 7:
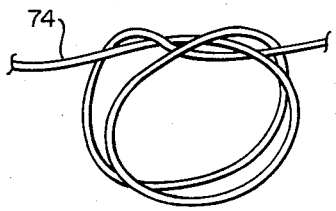
FIGURE 7 is a perspective view of the knot shown in FIGURE 6 but before the knot is tightened.

The heads themselves are provided with a groove 29 to receive the lacing material, which may be in the form of a polished twine, and to form the same into a knotted configuration. Thus, referring to FIGURE 3, it is noted that the head portions 19 and 25 together include the continuous groove 29 therein. A through bore 31 communicates between one side of the head 25 and the groove 29 itself. At the other end of the groove 29 another bore 33 communicates from the groove to the side of the head 19. Thus, cable lacing material may be passed endwise into the bore 31 and threaded through the configuration dictated by the groove 29 and out the bore 33. The particular configuration of the groove 29 will vary considerably depending upon the type of knot desired. However, the form shown in FIGURE 3 has been found particularly useful and produces a knot as shown in FIGURES 6 and 7. The particular knot shown in FIGURES 6 and 7 is such that it is easily tightened and relatively difficult to loosen even when the ends of the knot are cut short.

The particular configuration of the grooves can be seen in FIGURE 3. In viewing the drawing, it should be realized that the dashed lines indicate holes through the heads themselves. These may be molded with the heads or may be drilled after the heads are molded. The solid lines, on the other hand, indicate open grooves. The respective depth of a particular groove may be determined by inspection of an intersection of two grooves. The deeper groove appears, in the drawing, to overlie the more shallow groove. In addition, it must be realized that FIGURE 3 shows only the lower (as viewed in FIGURE 1) portion of the heads. The upper portion includes merely a pair of grooves, one of which interconnects the ends of the upper groove (FIGURE 3), and the other of which interconnects the lower groove.

Thus, it is seen that when the two heads are placed together, a single groove is formed which begins at a point in communication with the outside of the head; and makes a first and a second loop about the head opening. The second loop, at both its beginning and end, is passed behind the first (in the deeper groove). The groove then continues by passing in front of (the more shallow groove) the first mentioned intersection of the first and second loops. Lacing material passed through this groove thus forms a knot as shown in FIGURES 6 and 7.

Referring again to FIGURE 1, there is also included in the portion 13 of the handle a receiver 35 for a spool 37 of lacing material. The lacing material is guided from the spool 37 by a conduit 39 into registry with a feed assembly 41.

The drive assembly 41 includes a traction feed wheel 43 (FIGURES 1 and 2) which is mounted about a shaft 45 with a running fit. The shaft 45, in turn, is rotatably secured to the handle portion 13. Guide means 47 are pivoted about the point 49 and are urged toward the feed wheel 43 by a spring 51.

Referring more particularly to FIGURE 2, the traction drive means is explained. Thus, there is shown the shaft 45 rotatably secured to the handle portion 13. A drive spool 53 having a drive cable or cord 55 wound thereabout is secured to the shaft 45 by means of a pin 47. Activation of the drive cable 55 will be explained hereinafter in conjunction with FIGURES 4 and 5.

The feed wheel 43 itself is rotatably mounted about the drive spool 53. A ratchet ring 57 is disposed within the feed wheel 43 and permits free rotation of the wheel in a counterclockwise direction as shown in FIGURE 1. A clock spring 59 has one end connected to the ratchet ring 57 and its opposite end connected to the pin 47 for rotation therewith. The arrangement of the ratchet ring 57 within the feed wheel 43 is such to permit the spring 59 to drive the feed wheel 43 in the counter-clockwise direction as shown in FIGURE 1. In the clockwise direction, the spring is permitted to rotate without rotating the traction wheel itself. Rather than a separate ratchet ring or wheel, the interior surface of the feed wheel itself could be toothed to act as a ratchet in conjunction with the end of the clock spring 59.

There is also provided on the shaft 45 a clutch device including the clutch plate 61, backing plate 63, spring 65, and spring tension plate 67. The backing plate of the clutch is loosely pinned 69 to the shaft 45 whereby limited axial motion is permitted while the plate is kept in rotational alignment with the shaft 45 itself.

The feed wheel 43 includes, about its outer periphery, a series of notches 71 which are adapted to engage a detent or trip device 73 (FIGURE 1). The detent 73 is pivotally mounted on the handle portion 13 and is spring urged into engaging relationship with the feed wheel 43. Upon manually overcoming the spring tension on the detent 73, it is disengaged from the wheel 43 to permit rotation thereof.

In operation then, the feed drive assembly is first cocked by rotation of the drive wheel 53 with the drive cable 55. During the cocking action, the detent 73 is engaged with the feed wheel 43 to prevent rotation thereof. Cocking the drive assembly winds the clock spring 59 against the detent 73 by means of the ratchet 57. After the assembly is cocked, the detent 73 may be released thereby permitting the feed wheel 43 to rotate under spring tension in a counter-clockwise direction as seen in FIGURE 1. Since the lacing material 74 is wound about the feed wheel 43, it is engaged by the guide members 47 and is forced into the head assembly through the bore 31, about the grooves 29, and out the bore 33. The endwise drive of the lacing material through the head causes the knotted configuration although it does not complete the knot since, at this point, it is not tight.

Means, however, are also provided for tightening the knot with the cable lacer. To this extent, a gripping element 75 is included and may be activated when it is desired to tighten the knot. This activation may be entirely automatic and may be brought about upon merely opening the handle of the cable lacer. Thus, a slide 77 interposed between the head portion 19 has a stationary plate 79 mounted thereon. Both the plate 79 and the slide 77 have an opening therein which may be in registry with the bore 33. The slide may be forced to move in a downward position, as shown by the dashed lines in FIGURE 1, by means of a spring 81. The slide is selectively held against the force of the spring by means of a crank 83 which engages the handle portion 13 when the cable lacer is in a closed position. Upon rotating crank 83 in the clockwise direction, when the cable lacer is open, the openings in the interposed slide 77 is moved out of registry with the bore 33 and the opening in the plate 79. After the cable lacing material is directed about the grooves and out the bore 33, it is positioned in the opening 79 and held therein by the interposed slide 77.

Moreover, upon opening the handle thereof, the drive member 53 is reversed, as will be seen hereinafter. While the ratchet 57 slips during this reversal operation, it is noted that the clutch 61 remains engaged with the drive wheel 43 thereby causing a limited amount of reverse rotation thereof. Thus, upon opening the cable lacer, the ends of the cable are held by the individual handle portions and are drawn apart to tighten the knot. When the knot is sufficiently tight, the clutch 61 begins to slip whereby further reverse rotation of the feed wheel is prevented.

Figure 5:
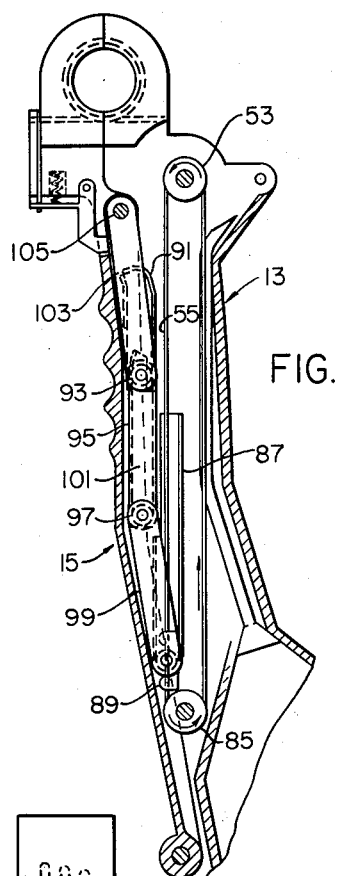
FIGURE 5 is an elevational view of the cable lacer shown in FIGURE 1 showing the travelling linkage therein with the lacer in the closed position.

Referring to FIGURES 4 and 5, the operation of the drive cable 55 is shown. After several convolutions about the drive wheel 53, the drive cord extends about an idler wheel 85 and is secured to a slide 89. The slide 89 rides in a track 87 which is disposed on the handle portion 13 in close proximity to one side of the drive cable 55. Another slide track 91 is disposed on the handle portion 13 and cooperates with a slide 93. A similar slide track 95 is mounted on the handle portion 15 and cooperates with the slide 97 contained therein. The various slides 89, 93 and 97 are joined by links 99 and 101. A third link 103 is pivoted at the point 105 on the handle portion 15 and extends to the slide 93. Thus, there is a linkage providing an extended degree of lineal travel for the slide member 89 in its track 87 upon opening and closing the handle portions 13 and 15. This lineal motion is used to traverse the drive cable 55 and to cause a relatively large number of rotations of the drive spool 53.

Figure 8:
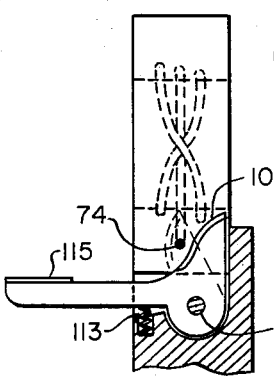
FIGURE 8 is a side elevational view of the lacer head in accordance with the invention showing the operation of the cable cutting means.

In addition, it is advisable to provide means not only for knotting the lacing material but also for cutting the material after a knot has been formed so as to provide neat ends thereto. To this extent, knife means are provided which may be operable either automatically or manually. In FIGURES 1 and 8 a knife blade 107 is shown pivoted at the point 109 in the head portion 25. An additional knife 111 may also be located in the head portion 19 for cutting the second end of the lacing material relatively short. Referring again to FIGURE 8, a spring 113 urges the knife 107 away from the lacing material. Upon depression of the handle 115, against the action of the spring 113, the knife blade 107 assumes the position shown by the dashed lines thereby cutting the lacing material 74.

Rather than with manual means, it is obvious that automatic means may be provided to operate the knives upon fully opening the handle portions 13 and 15.

In the operation of the cable lacer, a spool of lacing material is placed in the receiver 35 and is threaded about the feed wheel 43 into the bore 31. The handle portions 13 and 15 are fully opened and placed about the cable to be laced such that the cable lies within the opening 27. Upon closing the handle portions 13 and 15, the lacing material drive assembly is cocked by movement of the drive cable 55 and rotation of the drive member 53. After the handles are completely closed, the feed assembly is released by disengaging the detent 73 thus, permitting the clock spring 59 to rotate the feed wheel 43 to advance the lacing material 74. Axial movement of the lacing material 74 through the bore 31 and about the grooves 29 causes a knot-like configuration of the lacing material.

After the material has been driven about the grooves, the handle portions 13 and 15 are opened. Initial opening of the handles causes the interposing member 77 to secure one end of the lacing material. The other end of the lacing material is withdrawn by reverse motion of the feed wheel 43 caused by the clutch 61 and the reverse movement of the slide 89. The clutch 61, however, is such that it slips when a predetermined amount of force is applied. Thus, there is no tendency to cut the bundle of wires with the lacing material itself.

Upon fully opening the handle portions 13 and 15, a complete knot is formed. The knife means is then activated to separate the knotted lacing material from the source about the feed wheel 43. After cutting the material, either automatically or manually, the cable lacer is removed from the bound cable and is ready for a new operation.

Thus, it is seen that a new means for lacing cables is provided. The new means provides simple, fast operating and economical cable lacing. With a cable lacer as described the apparatus itself does the knitting thereby assuring that each knot is the same. Moreover, the apparatus here tightens the knot giving further assurance that human carelessness will not cut the harness with the lacing material by excessive tightening.

The power for moving the lacing material through the heads has been described as manual. This provides the lacer with particular portability; however, other means such as electric or pneumatic may be employed to actually move the lacing material.

We claim:

1. Apparatus for tying short sections of lacing material about a loose bundle of wires comprising a first and a second handle portion, said first handle portion including means for holding the lacing material, each of said handle portions including a mating head portion, said head portions in their mating position defining an opening for receiving the bundle of wires and a continuous groove about the central opening, said continuous groove having the configuration of a knot, and means on said first handle portion for selectively driving said lacing material about said groove, said means for driving the lacing material being spring loaded, said spring being cocked by closing said first and second handle portions.

2. Apparatus for tying short sections of lacing material about a loose bundle of wires comprising a first and a second handle portion, said first handle portion including means for holding the lacing material, each of said handle portions including a mating head portion, said head portions in their mating position defining an opening for receiving the bundle of wires and a continuous groove about the central opening, said continuous groove having the configuration of a knot, and means on said first handle portion for selectively driving said lacing material about said groove, said means for driving the lacing material comprising a drive wheel having means for frictional engagement with the lacing material on its outer periphery, the drive shaft arranged coaxially with said drive wheel, ratchet means operatively connected to said drive wheel, and resilient means interconnecting said ratchet means with said drive shaft whereby said drive wheel may be rotated by the drive shaft through said resilient means for one direction of rotation only.

3. Apparatus for tying short sections of lacing material about a bundle of wire as defined in claim 2 wherein said means for driving the lacing material further includes clutch means interconnecting said drive wheel and said drive shaft.

References Cited in the file of this patent
UNITED STATES PATENTS

| | | |
|---|---|---|
| 905,793 | Colman | Dec. 1, 1908 |
| 2,913,270 | Sachsenroder et al. | Nov. 17, 1959 |
| 2,913,271 | Sachsenroder et al. | Nov. 17, 1959 |